(12) United States Patent
Miyamoto et al.

(10) Patent No.: US 12,011,797 B2
(45) Date of Patent: Jun. 18, 2024

(54) SPINDLE AND CUTTING APPARATUS INCLUDING THE SAME

(71) Applicant: DGSHAPE Corporation, Hamamatsu (JP)

(72) Inventors: Kazuhito Miyamoto, Hamamatsu (JP); Gota Yamamoto, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 0 days.

(21) Appl. No.: 17/680,587

(22) Filed: Feb. 25, 2022

(65) Prior Publication Data

US 2023/0330796 A1 Oct. 19, 2023

(30) Foreign Application Priority Data

Feb. 26, 2021 (JP) ................. 2021-030234

(51) Int. Cl.
  *B23Q 3/157* (2006.01)
  *B23B 31/26* (2006.01)
  (Continued)

(52) U.S. Cl.
  CPC ........ *B23Q 3/15706* (2013.01); *B23B 31/265* (2013.01); *B23Q 11/10* (2013.01);
  (Continued)

(58) Field of Classification Search
  CPC ..... B23B 31/26; B23B 31/261; B23B 31/263; B23B 31/265; B23Q 1/70; B23Q 3/15706;
  (Continued)

(56) References Cited

U.S. PATENT DOCUMENTS 5,676,506 A * 10/1997 Sugata ................. B23Q 11/103
  408/59
5,860,776 A   1/1999 Sato et al.
  (Continued)

FOREIGN PATENT DOCUMENTS

CN     1162515 A    10/1997
CN   105415082 A     3/2016
  (Continued)

OTHER PUBLICATIONS

EPO Machine Translation of DE102019000920A1—Spindler, C; "Method For Drying Interior Of Processing Machine, Particularly Dental Milling Machine, Involves Providing Processing Machine With Housing"; Aug. 22, 2019.*
  (Continued)

*Primary Examiner* — Sunil K Singh
*Assistant Examiner* — Michael Vitale
(74) *Attorney, Agent, or Firm* — Keating & Bennett, LLP

(57) ABSTRACT

A spindle includes a housing including a first opening, a bearing housed in the housing, a main shaft rotatably supported by the bearing, a collet chuck in a first through hole defined in the main shaft to grip a machining tool and being movable in an axial direction of the main shaft, a draw bar connected to the collet chuck, and a cover covering the first opening and including a second through hole through which the main shaft is disposed. The main shaft and the cover are disposed at a distance from each other.

4 Claims, 11 Drawing Sheets

(51) Int. Cl.
*B23Q 11/10* (2006.01)
*B23Q 11/12* (2006.01)

(52) U.S. Cl.
CPC ... *B23Q 11/127* (2013.01); *Y10T 409/304032* (2015.01); *Y10T 409/309464* (2015.01); *Y10T 483/1783* (2015.01)

(58) Field of Classification Search
CPC .......... B23Q 11/10; B23Q 11/127; Y10T 408/45–46; Y10T 409/304032; Y10T 409/309464; Y10T 483/1783
USPC ............. 409/136, 233; 408/56–61; 483/55
See application file for complete search history.

(56) References Cited

U.S. PATENT DOCUMENTS

| | | | |
|---|---|---|---|
| 7,165,302 B2 * | 1/2007 | Kikkawa | B23Q 1/70 29/469 |
| 7,789,602 B2 * | 9/2010 | Duesing | A61C 1/144 433/129 |
| 9,265,592 B2 * | 2/2016 | Koch | B23Q 3/06 |
| 11,439,484 B2 * | 9/2022 | Rohner | A61C 13/0022 |
| 2004/0074074 A1 | 4/2004 | Kikkawa et al. | |
| 2004/0141819 A1 * | 7/2004 | Curtis | B23Q 11/1084 408/61 |
| 2011/0083307 A1 * | 4/2011 | Shih | B23Q 11/0053 409/137 |
| 2012/0308323 A1 * | 12/2012 | Gardner | B23Q 11/1076 409/117 |
| 2013/0108380 A1 * | 5/2013 | Lee | B23Q 11/10 279/20 |
| 2016/0074981 A1 | 3/2016 | Mochizuki et al. | |
| 2018/0297162 A1 | 10/2018 | Dohi et al. | |
| 2021/0140548 A1 * | 5/2021 | Wörmer | B23B 31/204 |

FOREIGN PATENT DOCUMENTS

| | | | | |
|---|---|---|---|---|
| CN | 108723850 A | | 11/2018 | |
| CN | 112792369 A | * | 5/2021 | ............... B23Q 1/70 |
| DE | 198 17 178 A1 | | 10/1998 | |
| DE | 102009011676 A1 | * | 7/2010 | ......... A61C 13/0009 |
| DE | 10 2019 000 920 A1 | | 8/2019 | |
| EP | 3 616 835 A1 | | 3/2020 | |
| JP | 2019-034354 A | | 3/2019 | |
| JP | 2020-028935 A | | 2/2020 | |

OTHER PUBLICATIONS

Official Communication issued in corresponding European Patent Application No. 22157501.2, dated Jul. 1, 2022.
Official Communication issued in corresponding Chinese Patent Application No. 202210150838.3, dated Dec. 26, 2023.

* cited by examiner

SPINDLE AND CUTTING APPARATUS INCLUDING THE SAME

CROSS REFERENCE TO RELATED APPLICATIONS

This application claims the benefit of priority to Japanese Patent Application No. 2021-030234 filed on Feb. 26, 2021. The entire contents of this application are incorporated herein by reference.

BACKGROUND OF THE INVENTION

1. Field of the Invention

The present invention relates to spindles and cutting apparatuses including the spindles.

2. Description of the Related Art

Cutting apparatuses known in the related art machine workpieces with rotatable machining tools. Such a cutting apparatus brings a machining tool into contact with a workpiece at a predetermined angle while three-dimensionally changing the positions of the workpiece and the machining tool relative to each other so as to machine the workpiece into a desired shape.

JP 2020-28935 A, for example, discloses a cutting apparatus including a spindle provided with: a main shaft rotatably supported by a bearing; a collet chuck that is inserted into a through hole defined in the main shaft and is able to grip a machining tool; and a housing that houses the main shaft and the collet chuck. The machining tool is detachably gripped by the collet chuck of the spindle. A workpiece is secured to a holder. For example, assuming that a Cartesian coordinate system for a machining space is defined by X, Y, and Z axes perpendicular to each other, the spindle is movable freely along the Y axis and the Z axis and able to rotate the machining tool around the Z axis, and the holder is movable freely along the X axis in the machining space and able to rotate the workpiece around the X axis and the Y axis.

During machining of the workpiece, the main shaft rotates. The rotation of the main shaft requires a gap between the main shaft and the housing that houses the main shaft. Machining of the workpiece produces chips that may penetrate into the gap. Adhesion of a large amount of chips to the gap unfortunately interferes with the rotation of the main shaft, making it difficult to machine the workpiece with the machining tool.

SUMMARY OF THE INVENTION

Accordingly, preferred embodiments of the present invention provide spindles that each prevent interference with rotation of main shafts caused by adhesion of chips.

The inventors of preferred embodiments of the present application have focused attention on the location of a gap between a main shaft that rotates at high speed and a cover that is attached to a housing. When the main shaft and the cover rotate together, a centrifugal force generated by the rotation of the main shaft causes chips adhering to the cover to move outward. According to the discoveries made by the inventors, the amount of chips that move and adhere to the gap unfavorably increases as the gap is located farther away from the main shaft. The inventors have discovered that bringing the location of the gap closer to the main shaft makes the chips less prone to adhere to the gap.

A spindle according to a preferred embodiment of the present invention includes a housing, a bearing, a main shaft, a collet chuck, a draw bar, and a cover. The housing includes a first opening and a second opening. The bearing is housed in the housing. The main shaft is rotatably supported by the bearing. The main shaft is provided with a first through hole passing through the main shaft in an axial direction of the main shaft. The main shaft includes a first end located on a first side in the axial direction, located adjacent to the first opening, and extending out of the housing through the first opening, and a second end located on a second side in the axial direction and located adjacent to the second opening. The collet chuck is disposed in the first through hole. The collet chuck is movable in the axial direction. The collet chuck includes a first collet end located adjacent to the first end of the main shaft, and a second collet end located adjacent to the second end of the main shaft. The first collet end is able to grip a machining tool to machine a workpiece. The draw bar is disposed in the first through hole. The draw bar is movable in the axial direction. The draw bar includes a first bar end located adjacent to the first end of the main shaft and connected to the second collet end, and a second bar end located adjacent to the second end of the main shaft. The cover covers the first opening. The cover is provided with a second through hole through which the main shaft extends. The main shaft and the cover are disposed at a distance from each other.

A spindle according to a preferred embodiment of the present invention includes the main shaft extending through the second through hole defined in the cover. The main shaft and the cover are disposed at a distance from each other. This creates a gap located laterally of the main shaft, so that rotation of the main shaft does not cause the cover to rotate. Accordingly, if the cover is relatively large in area, chips adhering to the cover would be unaffected by a centrifugal force generated by rotation of the main shaft and would thus not move. Consequently, creating the gap located laterally of the main shaft reduces the amount of chips adhering to the gap.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Spindle units and cutting apparatuses according to preferred embodiments of the present invention will be described below with reference to the drawings. The preferred embodiments described below is naturally not intended to limit the present invention in any way. Components and elements having the same functions are identified by the same reference signs, and description thereof will be simplified or omitted when deemed redundant.

Figure 1:
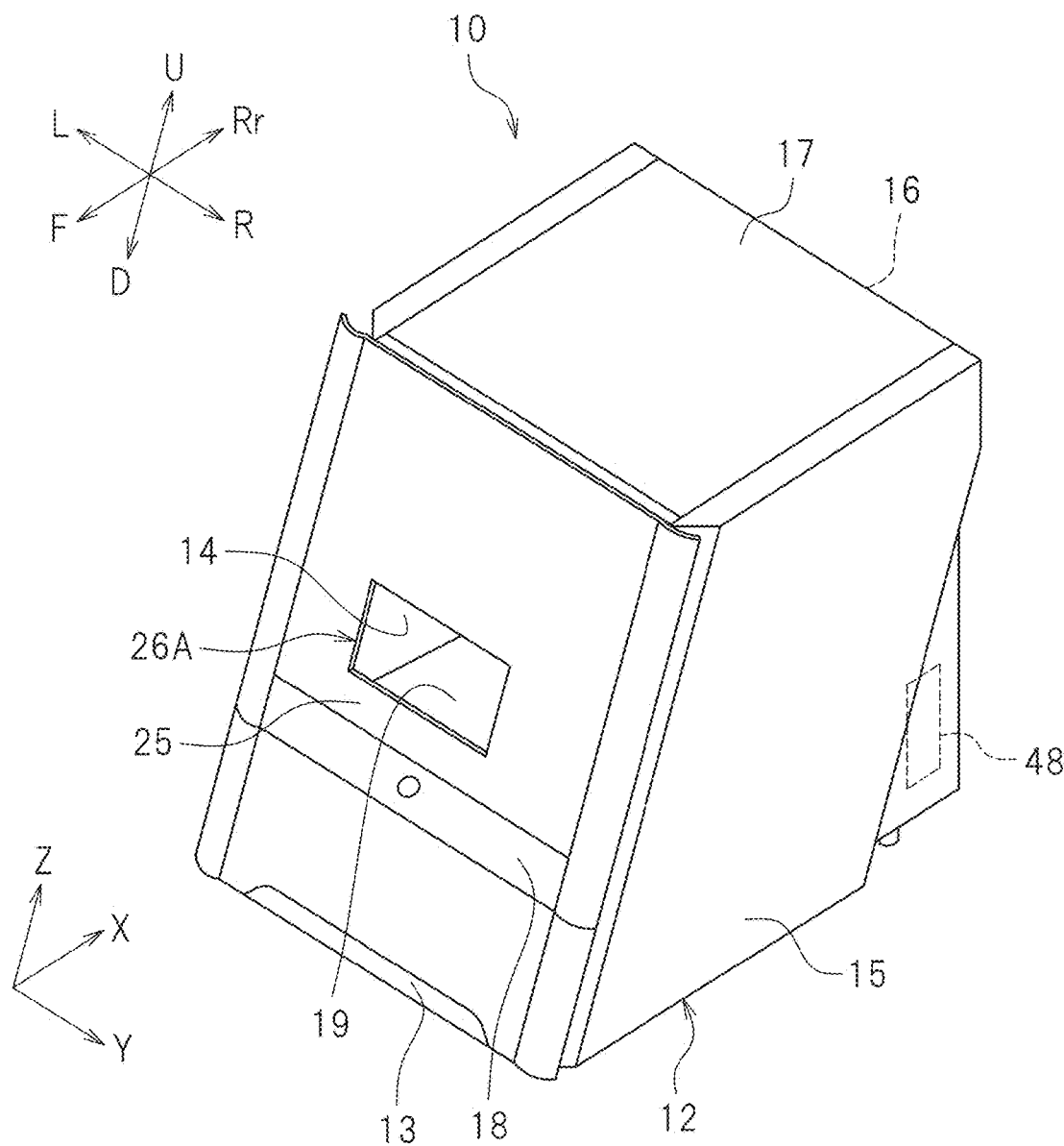
FIG. 1 is a perspective view of a cutting apparatus according to a preferred embodiment of the present invention.
Figure 2:
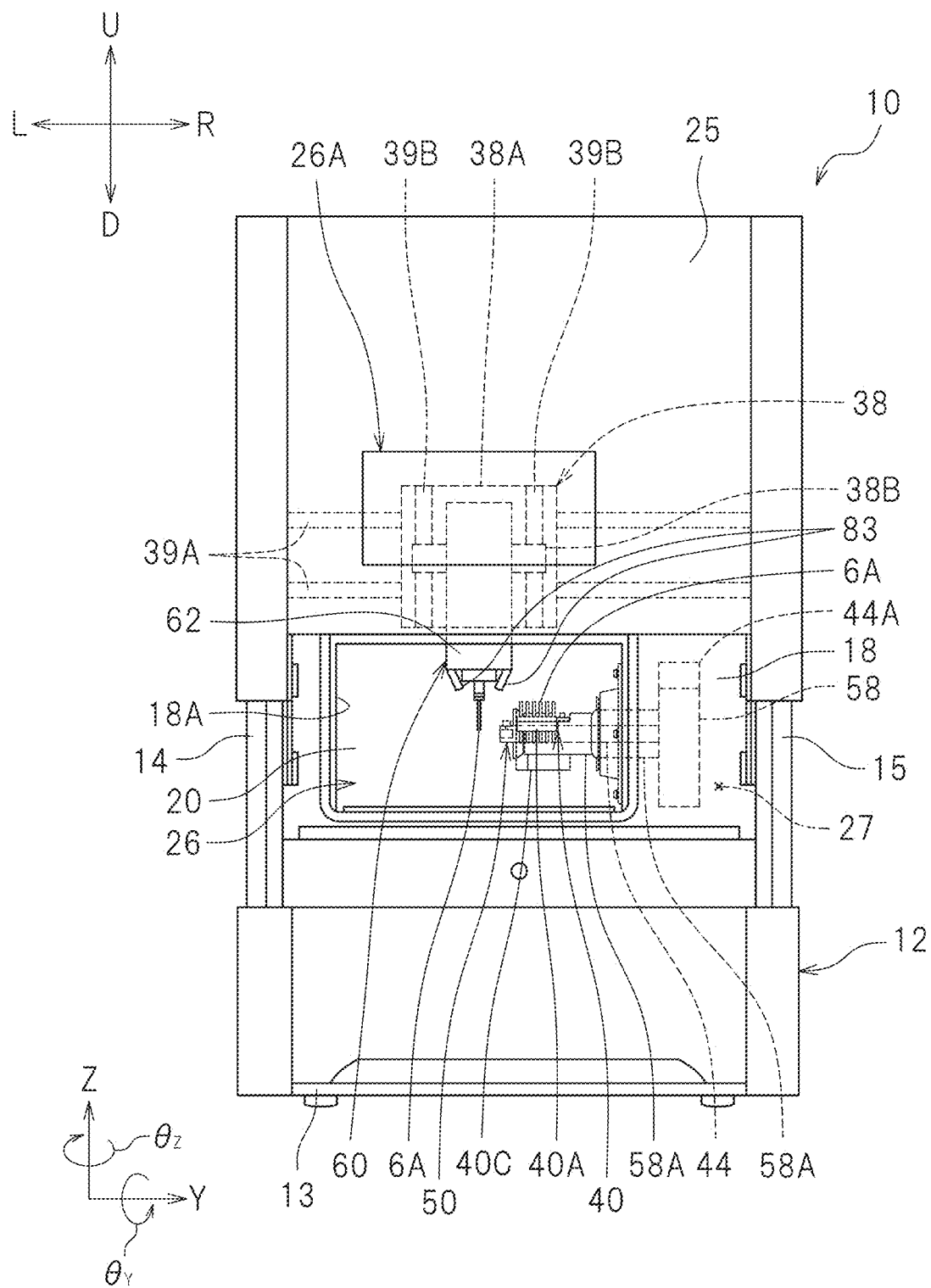
FIG. 2 is a front view of a cutting apparatus according to a preferred embodiment of the present invention.
Figure 3:
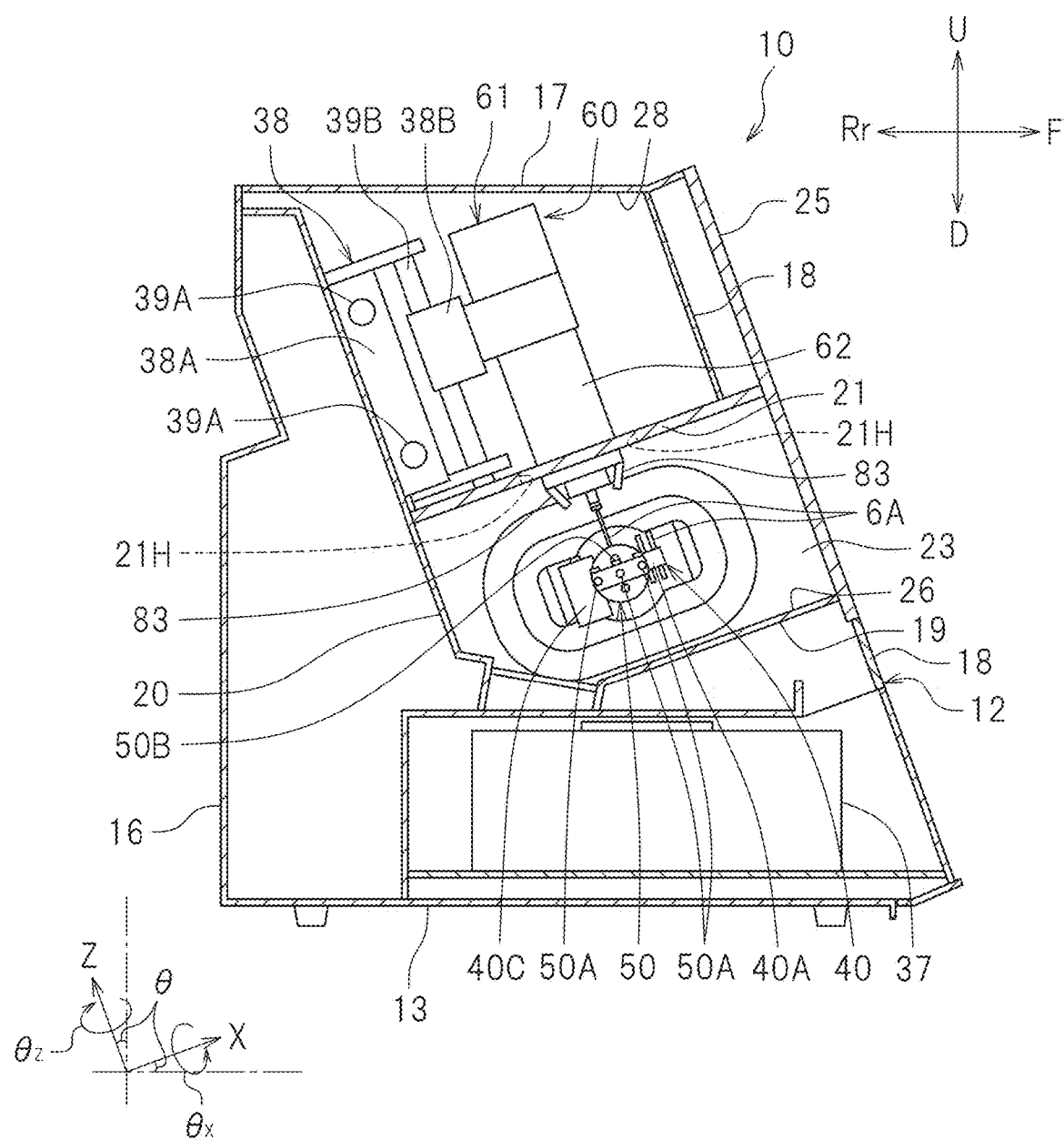
FIG. 3 is a cross-sectional view of a cutting apparatus according to a preferred embodiment of the present invention.

FIG. 1 is a perspective view of a cutting apparatus 10 according to the present preferred embodiment. FIG. 2 is a front view of the cutting apparatus 10. FIG. 3 is a cross-sectional view of the cutting apparatus 10. The following description is based on the assumption that when an operator is facing the front of the cutting apparatus 10, a direction away from the rear of the cutting apparatus 10 and toward the operator is a forward direction, and a direction away from the operator and toward the rear of the cutting apparatus 10 is a rearward direction. The terms "left", "right", "up", and "down" respectively refer to left, right, up, and down with respect to the operator facing the front of the cutting apparatus 10. The reference signs F, Rr, L, R, U, and D in the drawings respectively represent front, rear, left, right, up, and down. In the present preferred embodiment, the cutting apparatus 10 is located in a Cartesian coordinate system defined by X, Y, and Z axes perpendicular to each other. The X axis in the present preferred embodiment extends substantially in a front-rear direction. As illustrated in FIG. 3, the X axis in the present preferred embodiment is inclined relative to a horizontal direction by an angle θ. Alternatively, the X axis may extend in the same direction as the horizontal direction. The Y axis extends in a right-left direction. The Z axis extends substantially in an up-down direction. As illustrated in FIG. 3, the Z axis in the present preferred embodiment is inclined relative to a vertical direction by the angle θ. Alternatively, the Z axis may extend in the same direction as the vertical direction. The reference sign $θ_X$ represents a rotational direction around the X axis. The reference sign $θ_Y$ represents a rotational direction around the Y axis. The reference sign $θ_Z$ represents a rotational direction around the Z axis. These directions are defined merely for the sake of convenience of description and do not limit in any way how the cutting apparatus 10 may be installed or how the invention may be practiced.

Figure 4:
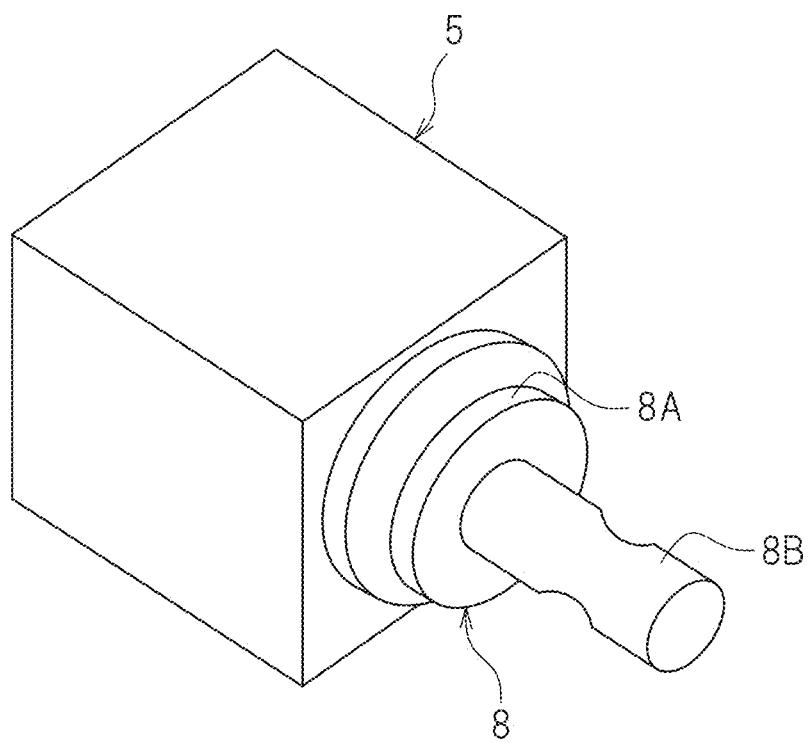
FIG. 4 is a perspective view of a workpiece to which an adapter according to a preferred embodiment of the present invention is attached.

The cutting apparatus 10 machines a workpiece 5 (see FIG. 4). Examples of machining processes to be performed by the cutting apparatus 10 include cutting. The cutting apparatus 10 grinds the workpiece 5 when necessary. The cutting apparatus 10 machines the workpiece 5 into a dental article, for example. Examples of such a dental article include a dental prosthetic (such as a crown, an inlay, an onlay, or a veneer), an artificial tooth, and a denture base. The workpiece 5 has, for example, a block shape (such as a prismatic shape). Alternatively, the workpiece 5 may have a disk shape. Examples of material(s) for the workpiece 5 include: resin materials, such as polymethyl methacrylate (PMMA) resin, polyether ether ketone (PEEK) resin, and hybrid resin; ceramic materials, such as glass ceramic and zirconia; wax; and gypsum. When zirconia is selected as a material for the workpiece 5, semi-sintered zirconia, for example, is used. The workpiece 5 is not limited to any particular shape or material.

As illustrated in FIG. 4, the present preferred embodiment involves attaching an adapter 8 (which may also be referred to as a "holder") to the workpiece 5. The workpiece 5 having the adapter 8 attached thereto is housed in the cutting apparatus 10 and subjected to cutting. In the present preferred embodiment, the adapter 8 includes a plate 8A and a connecting pin 8B. The plate 8A is connected to the workpiece 5. The connecting pin 8B protrudes from the plate 8A. The connecting pin 8B is inserted into an insertion hole 50A (see FIG. 3) defined in a clamp 50 (which will be described below). The adapter 8 holds the workpiece 5.

As illustrated in FIG. 1, the cutting apparatus 10 has a box shape. The cutting apparatus 10 includes a case body 12, a front cover 25, and a controller 48. The case body 12 includes a lower wall 13, a left wall 14 (see also FIG. 2), a right wall 15, a rear wall 16 (see also FIG. 3), an upper wall 17, a front wall 18, a bottom partition 19 (see FIG. 3), a rear partition 20 (see FIGS. 2 and 3), an upper partition 21 (see FIG. 3), and a side partition 23 (see FIG. 3). The left wall 14 extends upward from the left end of the lower wall 13. The right wall 15 extends upward from the right end of the lower wall 13. The rear wall 16 extends upward from the rear end of the lower wall 13. The left end of the rear wall 16 is connected to the rear end of the left wall 14. The right end of the rear wall 16 is connected to the rear end of the right wall 15. The front wall 18 extends upward from the front end of the lower wall 13. The left end of the front wall 18 is connected to the front end of the left wall 14. The right end of the front wall 18 is connected to the front end of the right wall 15. The front wall 18 is provided with an opening 18A (see FIG. 2). The upper wall 17 is connected to the upper ends of the left wall 14, the right wall 15, the rear wall 16, and the front wall 18. As illustrated in FIG. 3, the bottom partition 19 is disposed above the lower wall 13. The upper partition 21 is disposed above the bottom partition 19 and below the upper wall 17. The rear partition 20 is disposed forward of the rear wall 16 and rearward of the front wall 18. The side partition 23 is disposed rightward of the left wall 14 and leftward of the right wall 15. The side partition 23 extends upward from the bottom partition 19. The side partition 23 is connected to the bottom partition 19, the upper partition 21, and the rear partition 20.

As illustrated in FIG. 3, an internal space 26 is defined in the cutting apparatus 10. The internal space 26 is surrounded by the bottom partition 19, the left wall 14 (see FIG. 2), the rear partition 20, the upper partition 21, the side partition 23, and the front wall 18. The internal space 26 serves as a machining area where the workpiece 5 is to be machined. A first housing space 27 (see FIG. 2) is defined in the cutting apparatus 10. The first housing space 27 is surrounded by the bottom partition 19, the right wall 15 (see FIG. 2), the rear partition 20, the upper partition 21, the side partition 23, and the front wall 18. A conveyor 58 (which will be described below) is housed in the first housing space 27.

As illustrated in FIG. 2, the front cover 25 is provided on the front ends of the left wall 14 and the right wall 15 such that the front cover 25 is movable substantially in the up-down direction. Opening the front cover 25 by moving the front cover 25 upward brings the internal space 26 into communication with an external space. Closing the front cover 25 by moving the front cover 25 downward separates the internal space 26 from the external space. FIG. 2 illustrates the cutting apparatus 10, with the front cover 25 moved upward such that the internal space 26 is in communication with the external space. The front cover 25 is provided with a window 26A. The window 26A is made of, for example, a transparent acrylic plate. The operator is thus able to visually check the internal space 26 through the window 26A. The window 26A is smaller than the opening 18A defined in the front wall 18.

Figure 11:
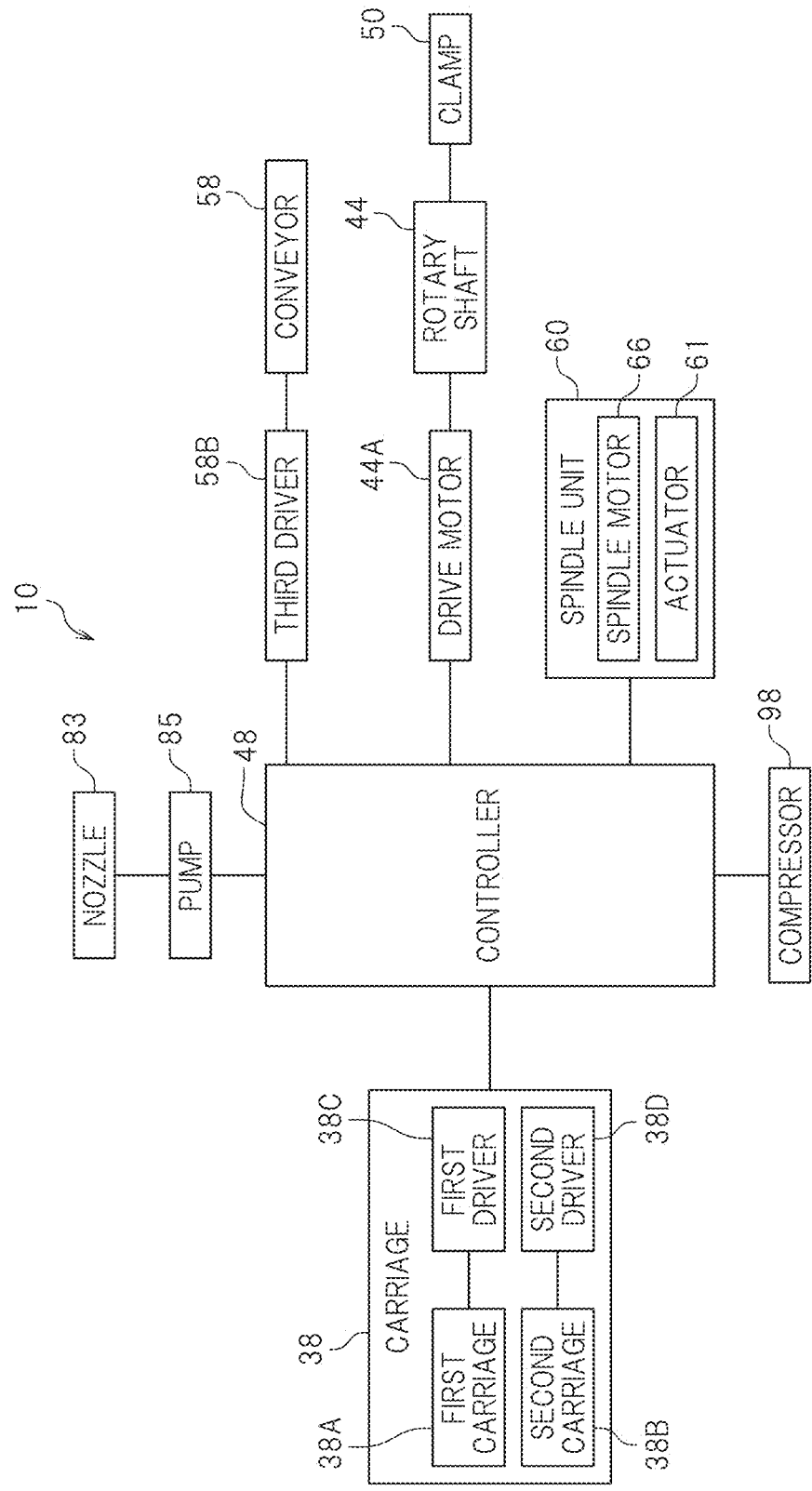
FIG. 11 is a block diagram of a cutting apparatus according to a preferred embodiment of the present invention.

As illustrated in FIG. 2, the cutting apparatus 10 includes a spindle unit 60, a carriage 38, a tool magazine 40 (see also FIG. 5), the clamp 50, and the conveyor 58. A second housing space 28 (see FIG. 3) is defined in the cutting apparatus 10. The second housing space 28 is surrounded by the upper partition 21, the left wall 14, the right wall 15, the rear partition 20, the upper wall 17, and the front wall 18. The carriage 38 and a portion of the spindle unit 60 are disposed in the second housing space 28. Another portion of the spindle unit 60 is disposed in the internal space 26. The spindle unit 60 is inserted through an opening 21H (see FIG. 3) defined in the upper partition 21. The tool magazine 40 and the clamp 50 are disposed in the internal space 26. The carriage 38 is an example of a unit conveyor. The carriage 38 is equipped with the spindle unit 60. The carriage 38 is movable in a Z-axis direction and a Y-axis direction. As used herein, the term "Z-axis direction" refers to a direction along the Z axis, and the term "Y-axis direction" refers to a direction along the Y axis. The carriage 38 moves the spindle unit 60 in the Z-axis direction and the Y-axis direction. The carriage 38 includes a first carriage 38A and a second carriage 38B. The first carriage 38A is supported by a pair of first guide shafts 39A extending in the Y-axis direction. The first carriage 38A is movable in the Y-axis direction along the first guide shafts 39A by a first driver 38C (see FIG. 11). The first guide shafts 39A are provided in the second housing space 28 (see FIG. 3). The left ends of the first guide shafts 39A are connected to the left wall 14. The right ends of the first guide shafts 39A are connected to the right wall 15. The second carriage 38B is supported by a pair of second guide shafts 39B extending in the Z-axis direction. The second carriage 38B is movable in the Z-axis direction along the second guide shafts 39B by a second driver 38D (see FIG. 11). The second guide shafts 39B are provided on the first carriage 38A. Movement of the first carriage 38A in the Y-axis direction thus moves the second carriage 38B in the Y-axis direction accordingly. The first driver 38C and the second driver 38D are controlled by the controller 48.

As illustrated in FIG. 2, the conveyor 58 is disposed in the first housing space 27. The conveyor 58 is disposed rightward of the tool magazine 40. The conveyor 58 includes a shaft 58A extending in the Y-axis direction. A portion of the shaft 58A (e.g., the right end portion of the shaft 58A) is disposed in the first housing space 27. Another portion of the shaft 58A (e.g., the left end portion of the shaft 58A) is disposed in the internal space 26. The tool magazine 40 is provided on the left end portion of the shaft 58A. The conveyor 58 is movable in an X-axis direction by a third driver 58B (see FIG. 11). As used herein, the term "X-axis direction" refers to a direction along the X axis. The conveyor 58 moves the tool magazine 40 in the X-axis direction. The third driver 58B is controlled by the controller 48.

Figure 5:
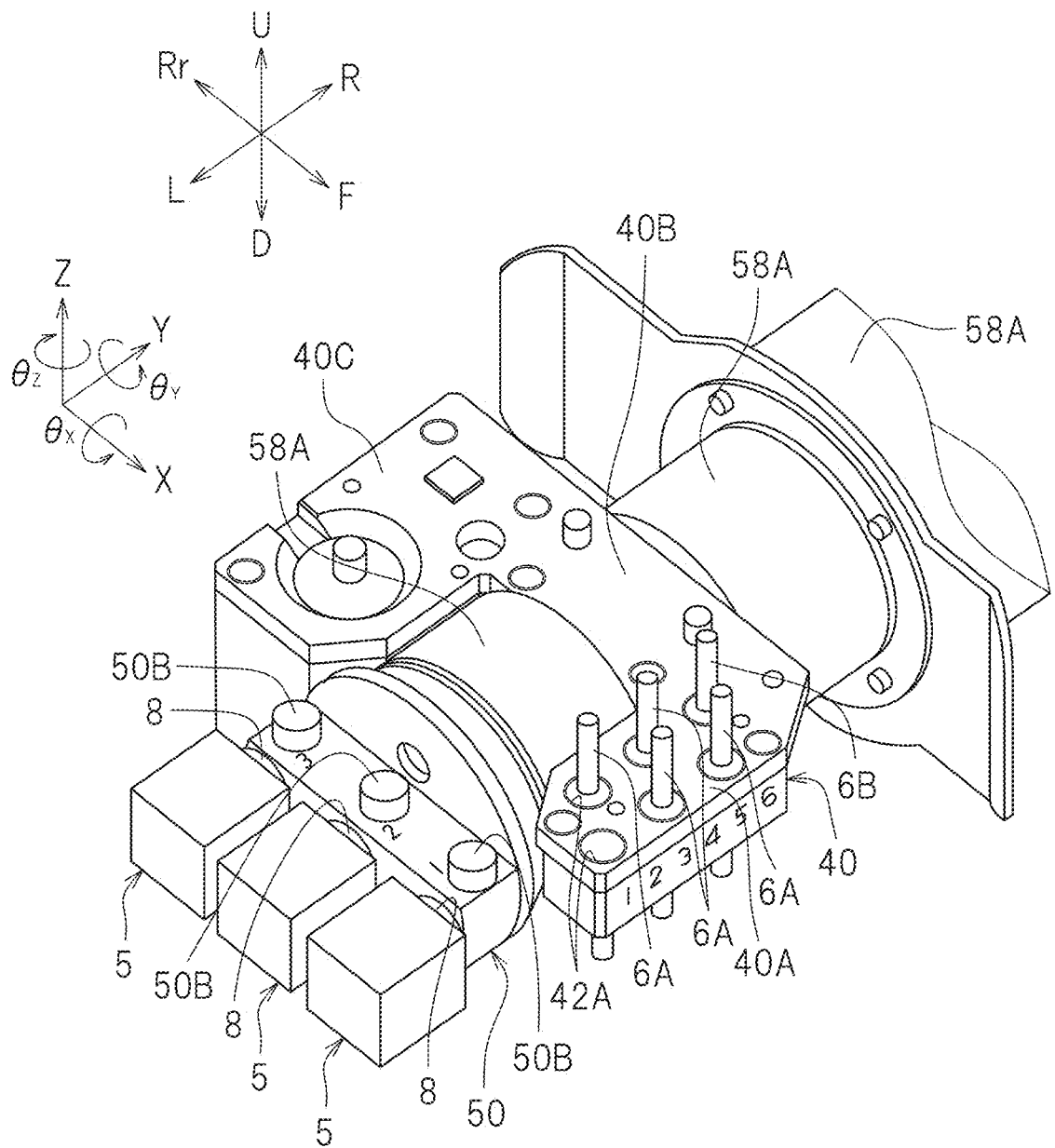
FIG. 5 is a perspective view of a tool magazine and a clamp according to a preferred embodiment of the present invention.

As illustrated in FIG. 5, the tool magazine 40 is able to hold a plurality of machining tools 6A and a detecting tool 6B. The tool magazine 40 is provided between the clamp 50 and the conveyor 58. Movement of the conveyor 58 in the X-axis direction moves the tool magazine 40 in the X-axis direction. The tool magazine 40 includes: a first portion 40A to hold the machining tools 6A and the detecting tool 6B; a second portion 40B located rearward of the first portion 40A and connected to the shaft 58A; and a third portion 40C located rearward of the second portion 40B. The first portion 40A of the tool magazine 40 is provided with a plurality of through holes 42A in which the machining tools 6A and the detecting tool 6B are to be held. In the present preferred embodiment, the number of through holes 42A is six, for example. The through holes 42A pass through the tool magazine 40 in the up-down direction. The machining tools 6A and the detecting tool 6B are each inserted into an associated one of the through holes 42A such that the upper portion of each of the machining tools 6A and the detecting tool 6B is exposed. Replacement of the machining tool 6A or the detecting tool 6B involves: returning the machining tool 6A or the detecting tool 6B gripped by a collet chuck 67 of a spindle 62 (which will be described below) to the associated through hole 42A; moving the spindle unit 60 to a position over the machining tool 6A or the detecting tool 6B to be used next; and causing the collet chuck 67 to grip the upper end of the machining tool 6A or the detecting tool 6B located under the collet chuck 67.

The machining tools 6A each have a rod shape. The cutting apparatus 10 uses the machining tool(s) 6A in cutting the workpiece 5. Each machining tool 6A gradually wears out in the course of cutting the workpiece 5. Each machining tool 6A is made of a conductive material, such as metal. The detecting tool 6B has a rod shape. The cutting apparatus 10 uses the detecting tool 6B in making automatic corrections involving suitably correcting the relative positions of the workpiece 5 and the spindle unit 60, the relative positions of the tool magazine 40 and the spindle unit 60, and/or the relative positions of the clamp 50 and the spindle unit 60. The detecting tool 6B is made of a conductive material, such as metal.

As illustrated in FIG. 2, a rotary shaft 44 is provided inside the shaft 58A. The rotary shaft 44 supports the clamp 50 such that the clamp 50 is rotatable. The rotary shaft 44 extends in the right-left direction. The rotary shaft 44 is coupled to the clamp 50 and the conveyor 58. A drive motor 44A (see also FIG. 11) is provided on the conveyor 58. The drive motor 44A is controlled by the controller 48. The rotary shaft 44 is rotatable in the rotational direction $\theta_Y$ around the Y axis by the drive motor 44A. The rotation of the rotary shaft 44 in the rotational direction $\theta_Y$ around the Y axis causes the clamp 50 to rotate in the rotational direction $\theta_Y$ around the Y axis. The rotary shaft 44 is rotatable independently of the shaft 58A. The rotation of the rotary shaft 44 in the rotational direction $\theta_Y$ around the Y axis thus does not cause the shaft 58A to rotate in the rotational direction $\theta_Y$ around the Y axis.

Figure 6:
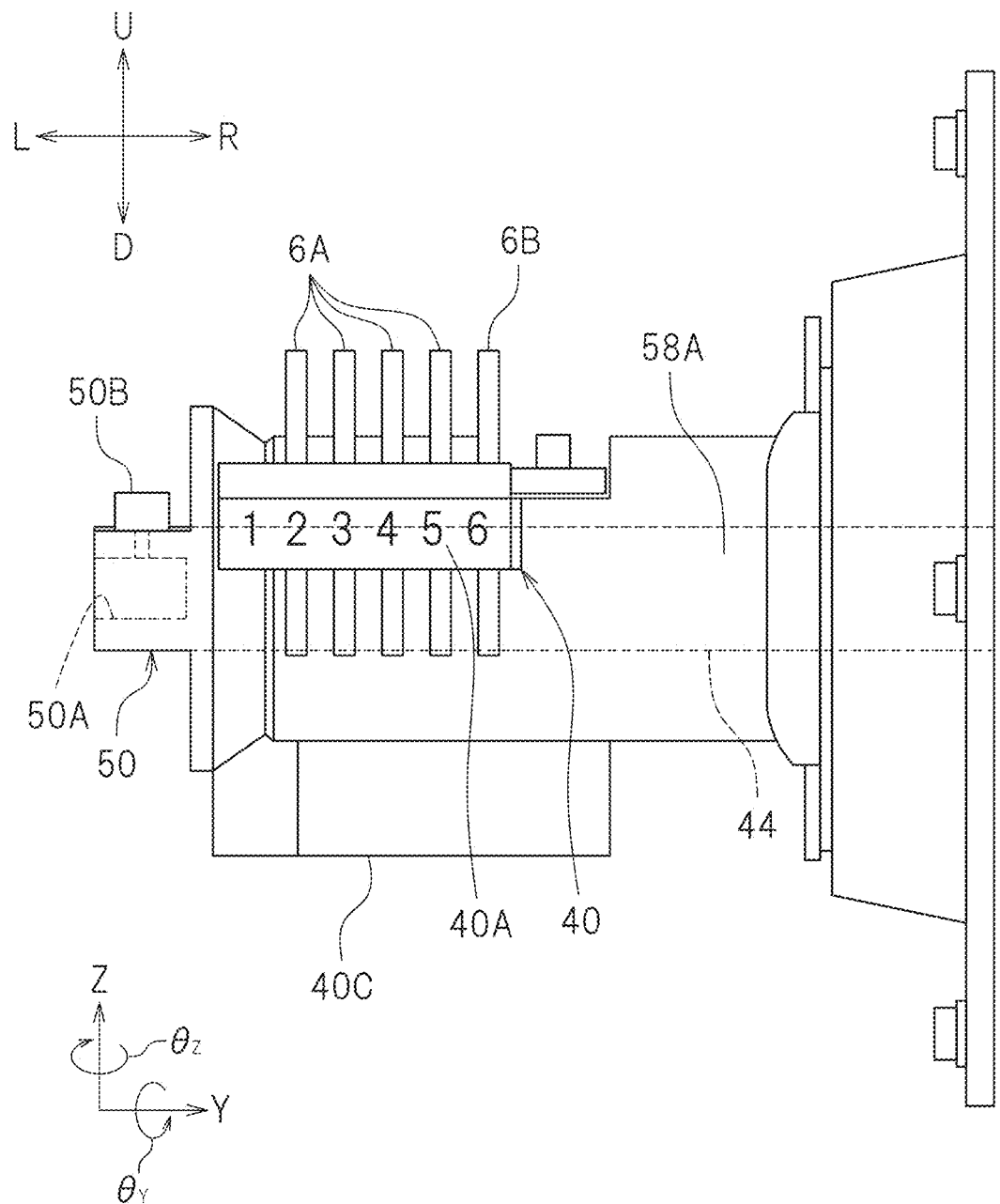
FIG. 6 is a front view of a tool magazine and a clamp according to a preferred embodiment of the present invention.

As illustrated in FIG. 6, the clamp 50 is provided on the left end of the rotary shaft 44. The clamp 50 is disposed leftward of the tool magazine 40. The clamp 50 holds the adapter 8 such that the adapter 8 is detachable from the clamp 50. As illustrated in FIG. 5, the number of adapters 8 the clamp 50 is able to hold is three in the present preferred embodiment. The clamp 50 holds the workpiece(s) 5 through the adapter(s) 8. The clamp 50 is an example of a holder. As illustrated in FIG. 3, the clamp 50 is provided with more than one insertion hole 50A. In the present preferred embodiment, the number of insertion holes 50A is three, for example, and the three insertion holes 50A are aligned in the front-rear direction of the clamp 50. The connecting pins 8B (see FIG. 4) of the adapters 8 are each inserted into an associated one of the insertion holes 50A. The connecting pins 8B inserted into the insertion holes 50A are secured to the clamp 50 with screws 50B (see FIG. 5). The clamp 50 is movable together with the tool magazine 40. Specifically, the tool magazine 40 and the clamp 50 are movable in the X-axis direction by the conveyor 58. The rotation of the clamp 50 in the rotational direction $\theta_Y$ around the Y axis does not cause the tool magazine 40 to rotate in the rotational direction $\theta_Y$ around the Y axis.

Figure 7:
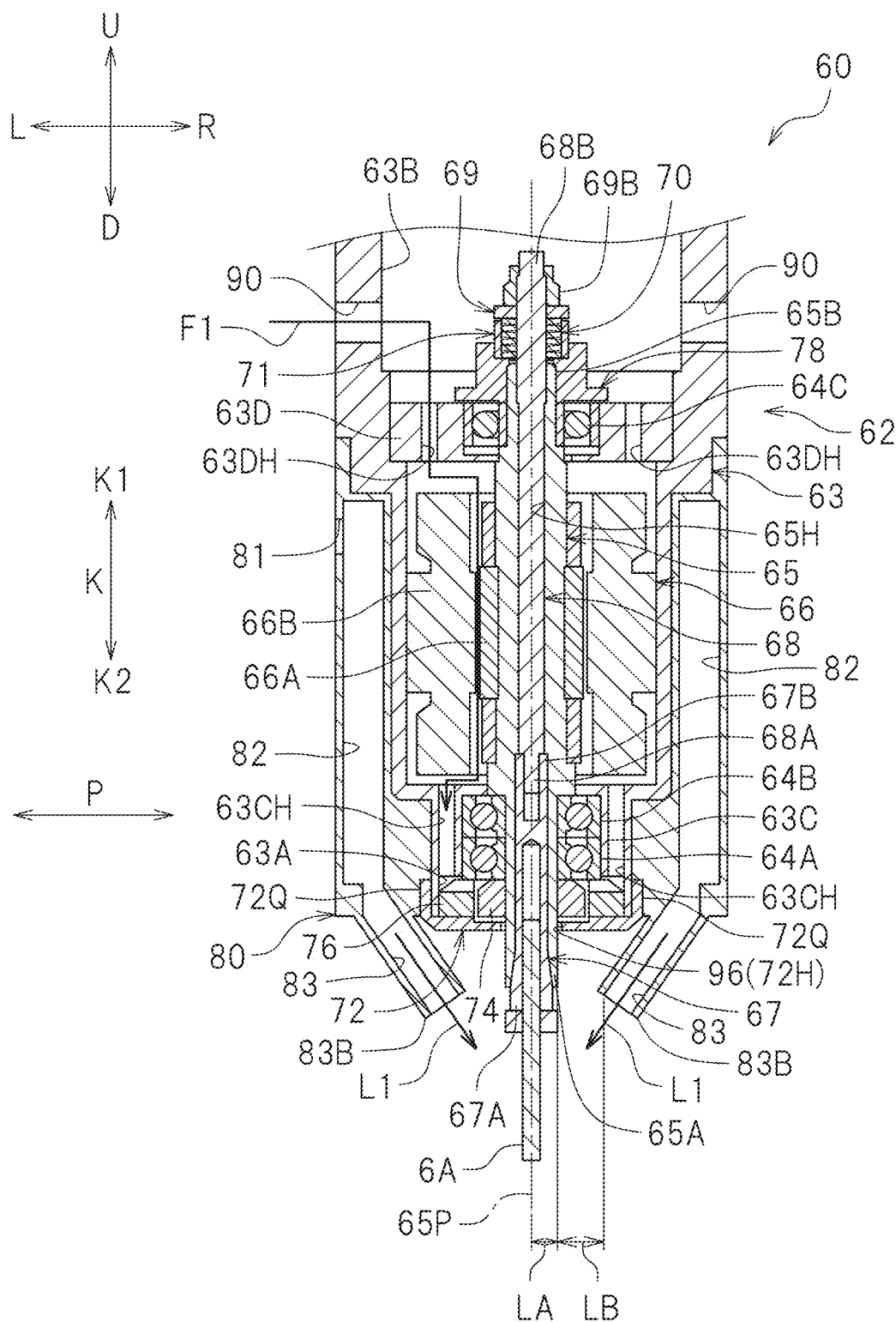
FIG. 7 is a cross-sectional view of a spindle according to a preferred embodiment of the present invention.

As illustrated in FIG. 7, the spindle unit 60 includes the spindle 62 and an actuator 61 (see FIG. 3). As illustrated in FIG. 3, the actuator 61 is detachably provided on the upper portion of the spindle 62. The actuator 61 controls movement of a draw bar 68 (see FIG. 7) of the spindle 62 in the up-down direction. The draw bar 68 will be described below. The actuator 61 controls attaching and detaching of the machining tool 6A or the detecting tool 6B to and from the collet chuck 67 (which will be described below) of the spindle 62.

Figure 8:
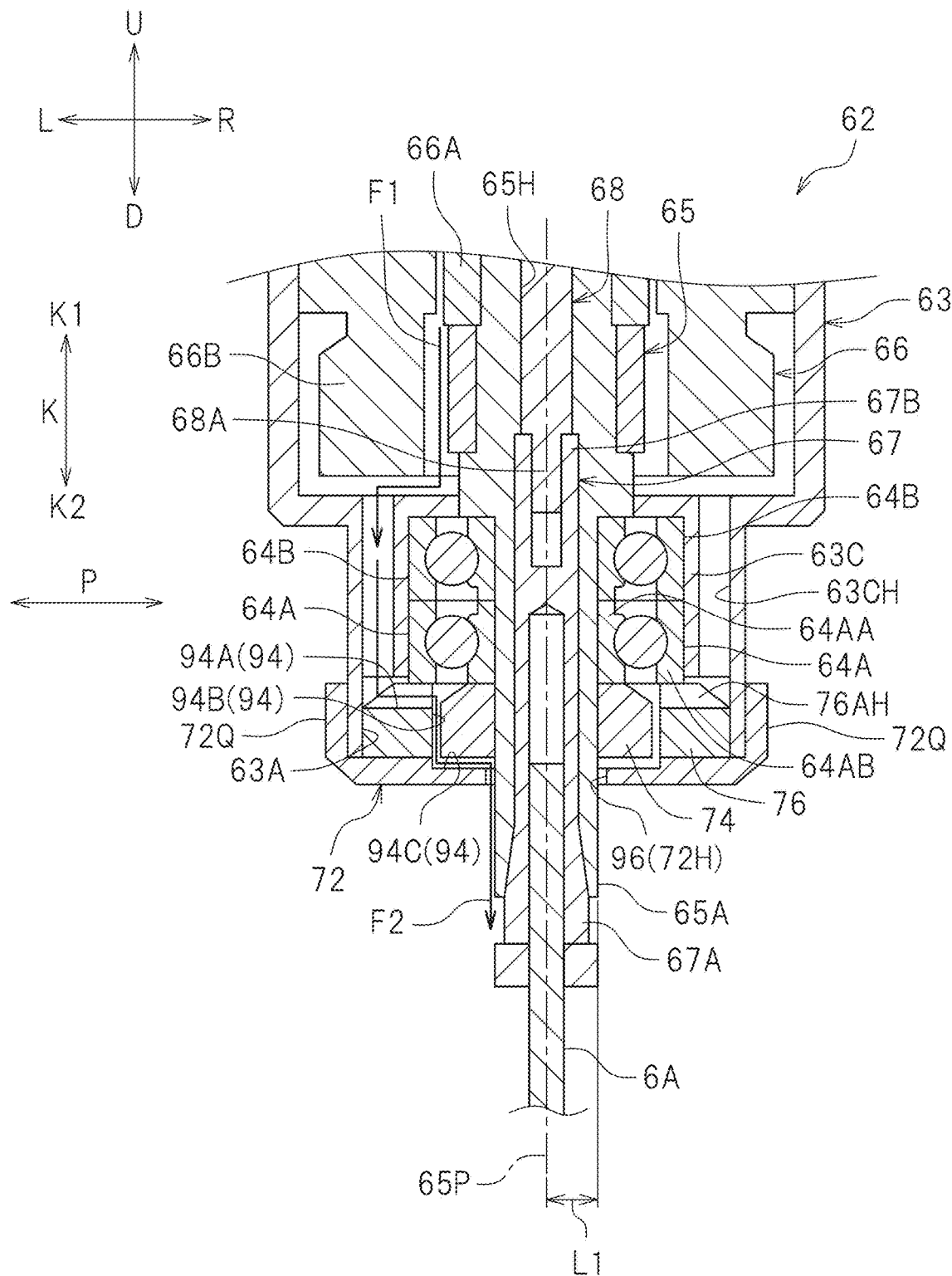
FIG. 8 is a partially enlarged cross-sectional view of a spindle according to a preferred embodiment of the present invention.

As illustrated in FIG. 7, the spindle 62 includes a housing 63, a first bearing 64A, a second bearing 64B, a third bearing 64C, a main shaft 65, a spindle motor 66, the collet chuck 67, the draw bar 68, an urger 70, a stopper 71, a cover 72, a first securer 74, a second securer 76, a third securer 78, a coolant container 80, air inlets 90, an air passage 94 (see FIG. 8), and an air outlet 96 (see FIG. 8). The terms "above" and "below" as used herein in connection with the spindle 62 respectively refer to, for example, being located above and below in an axial direction K of the main shaft 65. The axial direction K in the present preferred embodiment is parallel or substantially parallel to the Z axis. Specifically, the axial direction K is inclined relative to the vertical direction by the angle $\theta$.

Figure 9:
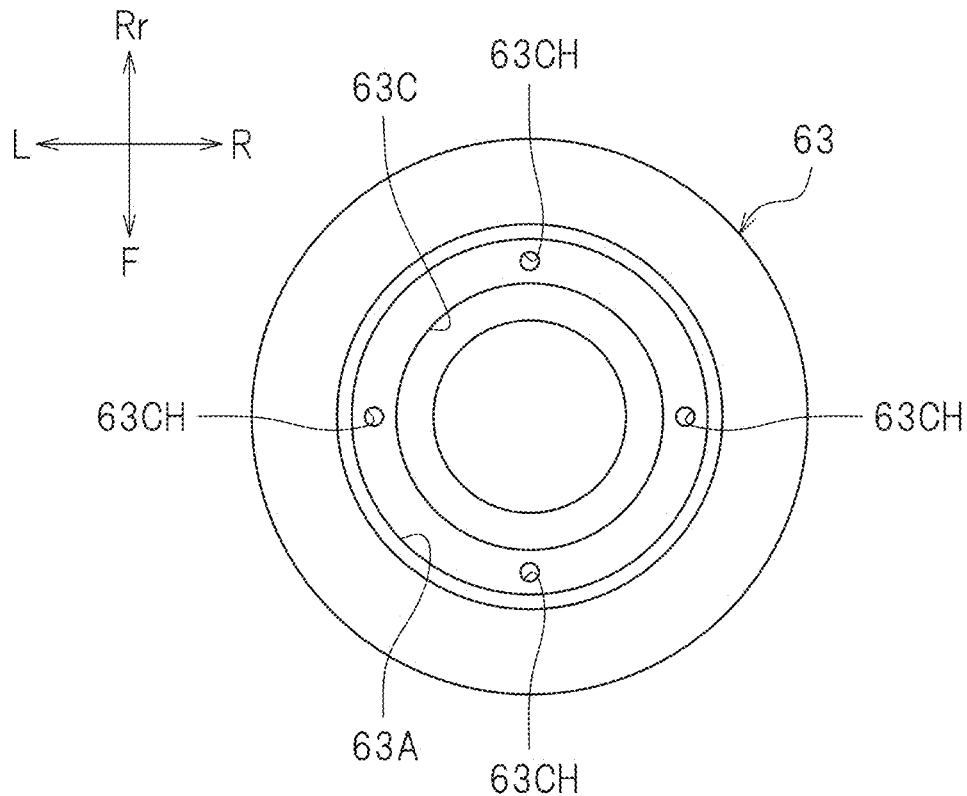
FIG. 9 is a bottom view of a housing according to a preferred embodiment of the present invention.

As illustrated in FIG. 7, the housing 63 has a substantially cylindrical shape. The housing 63 is provided with: a first opening 63A located in the lower portion of the housing 63; and a second opening 63B located in the upper portion of the housing 63. The housing 63 includes: a first bearing holder 63C located adjacent to the first opening 63A; and a second bearing holder 63D located adjacent to the second opening 63B. The first bearing holder 63C holds the first bearing 64A and the second bearing 64B. The second bearing holder 63D holds the third bearing 64C. The second bearing holder 63D is provided with through holes 63DH. Compressed air supplied from a compressor 98 (see FIG. 11) passes through the through holes 63DH. The compressor 98 will be described below. The through holes 63DH pass through the second bearing holder 63D in the up-down direction. The first bearing holder 63C is provided with a plurality of through holes 63CH (see also FIG. 9). In the present preferred embodiment, the number of through holes 63CH is four, for example, and the four through holes 63CH are disposed at regular intervals (e.g., intervals of 90 degrees) in a circumferential direction of the first bearing holder 63C. The first bearing holder 63C may be provided with any other suitable number of through holes 63CH. The through holes 63CH pass through the first bearing holder 63C in the up-down direction. The through holes 63CH are located outward of the first bearing 64A and the second bearing 64B.

As illustrated in FIG. 7, the first bearing 64A, the second bearing 64B, and the third bearing 64C are housed in the housing 63. The first bearing 64A and the second bearing 64B are located adjacent to the first opening 63A of the housing 63. The second bearing 64B is disposed on the first bearing 64A. The first bearing 64A and the second bearing 64B are held by the first securer 74 and the second securer 76. More specifically, the first bearing 64A is held directly by the first securer 74 and the second securer 76, and the second bearing 64B is held indirectly by the first securer 74 and the second securer 76 through the first bearing 64A. The third bearing 64C is located adjacent to the second opening 63B of the housing 63. The third bearing 64C is held by the second bearing holder 63D. The third bearing 64C is disposed above the second bearing 64B. The first bearing 64A, the second bearing 64B, and the third bearing 64C support the main shaft 65 such that the main shaft 65 is rotatable. The first bearing 64A is an example of a bearing.

As illustrated in FIG. 7, the main shaft 65 extends in the up-down direction. The main shaft 65 is housed in the housing 63. The main shaft 65 is rotatably supported by the first bearing 64A, the second bearing 64B, and the third bearing 64C. The main shaft 65 is provided with a first through hole 65H passing through the main shaft 65 in the axial direction K (which corresponds to the up-down direction in the present preferred embodiment). The main shaft 65 includes a first end 65A and a second end 65B. The first end 65A is located on a first side in the axial direction K (which corresponds to the lower side in the axial direction K in the present preferred embodiment). The first end 65A is located adjacent to the first opening 63A. The first end 65A extends out of the housing 63 through the first opening 63A. The first end 65A is located outside the housing 63. The second end 65B is located on a second side in the axial direction K (which corresponds to the upper side in the axial direction K in the present preferred embodiment). The second end 65B is located adjacent to the second opening 63B. A portion of the first through hole 65H adjacent to the first end 65A increases in diameter as the portion extends downward (i.e., as the portion extends away from the second end 65B).

As illustrated in FIG. 7, the spindle motor 66 is housed in the housing 63. The spindle motor 66 is disposed between the second bearing 64B and the third bearing 64C. The spindle motor 66 includes a rotor 66A and a stator 66B. The rotor 66A is integral with the main shaft 65. The stator 66B is disposed to face the rotor 66A. Passage of a current through the stator 66B rotates the main shaft 65 at high speed. The spindle motor 66 is controlled by the controller 48.

As illustrated in FIG. 7, the collet chuck 67 extends in the up-down direction. The collet chuck 67 is inserted into the first through hole 65H. The collet chuck 67 is movable in the axial direction K. The collet chuck 67 includes a first collet end 67A and a second collet end 67B. The first collet end 67A is located adjacent to the first end 65A of the main shaft 65. In the present preferred embodiment, the first collet end 67A is the lower end of the collet chuck 67. The first collet end 67A is able to grip either one of the machining tool 6A and the detecting tool 6B. A portion of the first collet end 67A protrudes out of the first through hole 65H. The second collet end 67B is located adjacent to the second end 65B of the main shaft 65. In the present preferred embodiment, the second collet end 67B is the upper end of the collet chuck 67. The second collet end 67B is located within the first through hole 65H.

A illustrated in FIG. 7, the draw bar 68 extends in the up-down direction. The draw bar 68 is inserted into the first through hole 65H. The draw bar 68 is movable in the axial direction K. The draw bar 68 is disposed above the collet chuck 67. The draw bar 68 includes a first bar end 68A and a second bar end 68B. The first bar end 68A is located adjacent to the first end 65A of the main shaft 65. In the present preferred embodiment, the first bar end 68A is the lower end of the draw bar 68. The first bar end 68A is connected to the second collet end 67B. The first bar end 68A is located within the first through hole 65H. The second bar end 68B is located adjacent to the second end 65B of the main shaft 65. In the present preferred embodiment, the second bar end 68B is the upper end of the draw bar 68. The second bar end 68B protrudes out of the first through hole 65H. The second bar end 68B is to be pressed by a push rod (not illustrated) of the actuator 61 (see FIG. 3). The draw bar 68 includes a flange 69. Contact of the flange 69 with a retainer 69B, such as a nut, stops movement of the draw bar 68 in a first direction K1. As used herein, the term "first direction K1" refers to a direction from the first end 65A of the main shaft 65 to the second end 65B of the main shaft 65.

As illustrated in FIG. 7, the urger 70 is disposed around the draw bar 68. The urger 70 is supported by the third securer 78 attached to the main shaft 65. The urger 70 includes, for example, a plurality of disc springs. The draw bar 68 is inserted through the urger 70. The urger 70 is in contact with the draw bar 68 so as to urge the draw bar 68 in the first direction K1. In the present preferred embodiment, the urger 70 is in contact with the flange 69 of the draw bar 68 so as to urge the draw bar 68 in the first direction K1.

As illustrated in FIG. 7, the stopper 71 is disposed laterally of the urger 70. The stopper 71 is disposed around the urger 70. The stopper 71 is able to come into contact with the flange 69 of the draw bar 68. The stopper 71 comes into contact with the flange 69 of the draw bar 68 so as to prevent the draw bar 68 from moving in a second direction K2 by a distance longer than a predetermined distance. As used herein, the term "second direction K2" refers to a direction from the second end 65B of the main shaft 65 to the first end 65A of the main shaft 65.

As illustrated in FIG. 8, the first securer 74 is secured to the main shaft 65. The first securer 74 is housed in the housing 63. The first securer 74 holds the first bearing 64A and the second bearing 64B from below. More specifically, the first securer 74 holds an inner ring 64AA of the first bearing 64A from below. The first securer 74 restricts movement of the first bearing 64A and the second bearing 64B in the axial direction K. The first securer 74 has a ring shape. The first securer 74 is, for example, a nut.

Figure 10:
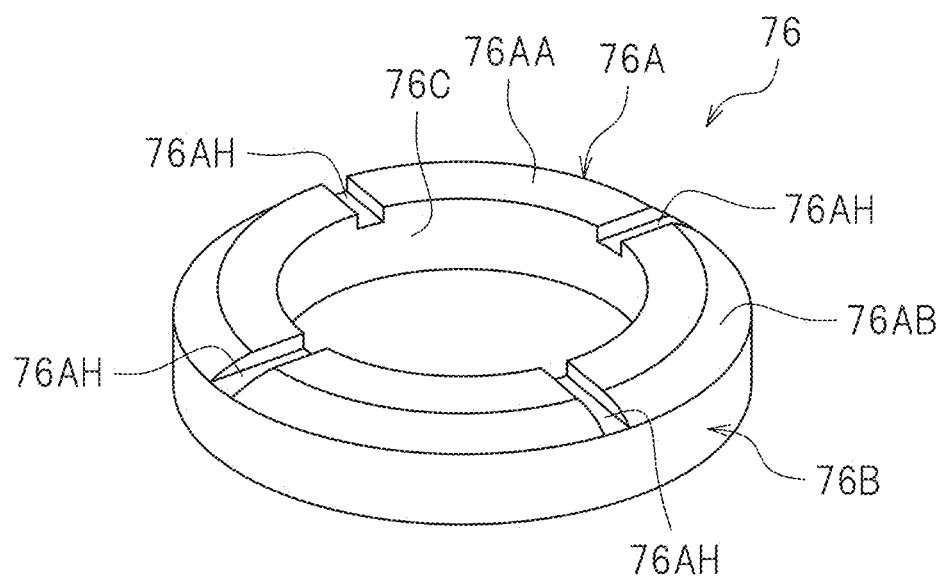
FIG. 10 is a perspective view of a second securer according to a preferred embodiment of the present invention.

As illustrated in FIG. 8, the second securer 76 is secured to the housing 63. The second securer 76 is housed in the housing 63. The second securer 76 is located outward of the first securer 74. The first securer 74 and the second securer 76 have a gap therebetween. The second securer 76 holds the first bearing 64A and the second bearing 64B from below. More specifically, the second securer 76 holds an outer ring 64AB of the first bearing 64A from below. The second securer 76 restricts movement of the first bearing 64A and the second bearing 64B in the axial direction K. As illustrated in FIG. 10, the second securer 76 has a ring shape. The second securer 76 includes: a first portion 76A pressing the first bearing 64A from below; a second portion 76B secured to the housing 63; and an opening 76C. The first portion 76A includes: an upper surface 76AA in contact with the outer ring 64AB of the first bearing 64A; and an inclined surface 76AB extending obliquely downward from the upper surface 76AA. The first portion 76A is provided with recesses 76AH recessed downward from the upper surface 76AA and the inclined surface 76AB. In the present preferred embodiment, the number of recesses 76AH is four, for example. The recesses 76AH are each in communication with an associated one of the through holes 63CH (see FIG. 8) of the housing 63.

As illustrated in FIG. 7, the third securer 78 is secured to the main shaft 65. The third securer 78 is secured to the second end 65B of the main shaft 65. The third securer 78 restricts movement of the third bearing 64C in the axial direction K. The third securer 78 holds the urger 70 and the stopper 71. The third securer 78 is, for example, a nut.

Figure 13:
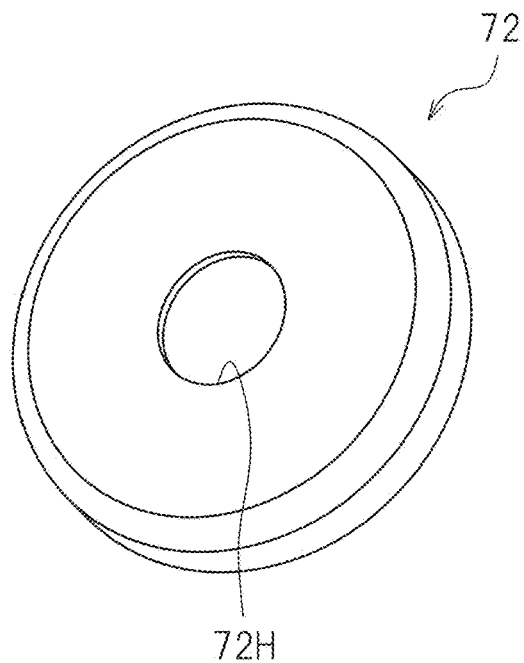
FIG. 13 is a perspective view of a cover according to a preferred embodiment of the present invention.

As illustrated in FIG. 7, the cover 72 covers the first opening 63A of the housing 63. The cover 72 is a component of the housing 63. The cover 72 is made of, for example, a resin material (e.g., polyacetal resin). As illustrated in FIG. 13, the cover 72 has a disk shape. The cover 72 is provided with a second through hole 72H (see also FIG. 13) through which the main shaft 65 is disposed. The second through hole 72H is larger in diameter than the main shaft 65. The cover 72 is disposed at a distance from the main shaft 65. This creates a gap between the main shaft 65 and the cover 72 such that rotation of the main shaft 65 does not cause the cover 72 to rotate. The cover 72 is disposed at a distance from the first securer 74. The cover 72 is in contact with the second securer 76. Alternatively, the cover 72 may be disposed at a distance from the second securer 76.

As illustrated in FIG. 8, the air outlet 96 is defined in the housing 63. More specifically, the air outlet 96 is defined between the main shaft 65 and a portion of the cover 72 where the second through hole 72H is provided. The air outlet 96 opens downward in the axial direction K of the main shaft 65. The air outlet 96 is located below the first bearing 64A. As illustrated in FIG. 7, the air outlet 96 is located above lower ends 83B of nozzles 83 (which will be described below). As will be described below, air inside the housing 63 is discharged out of the housing 63 through the air outlet 96. More specifically, air flowing below the first bearing 64A is discharged out of the housing 63 through the air outlet 96.

Figure 12:
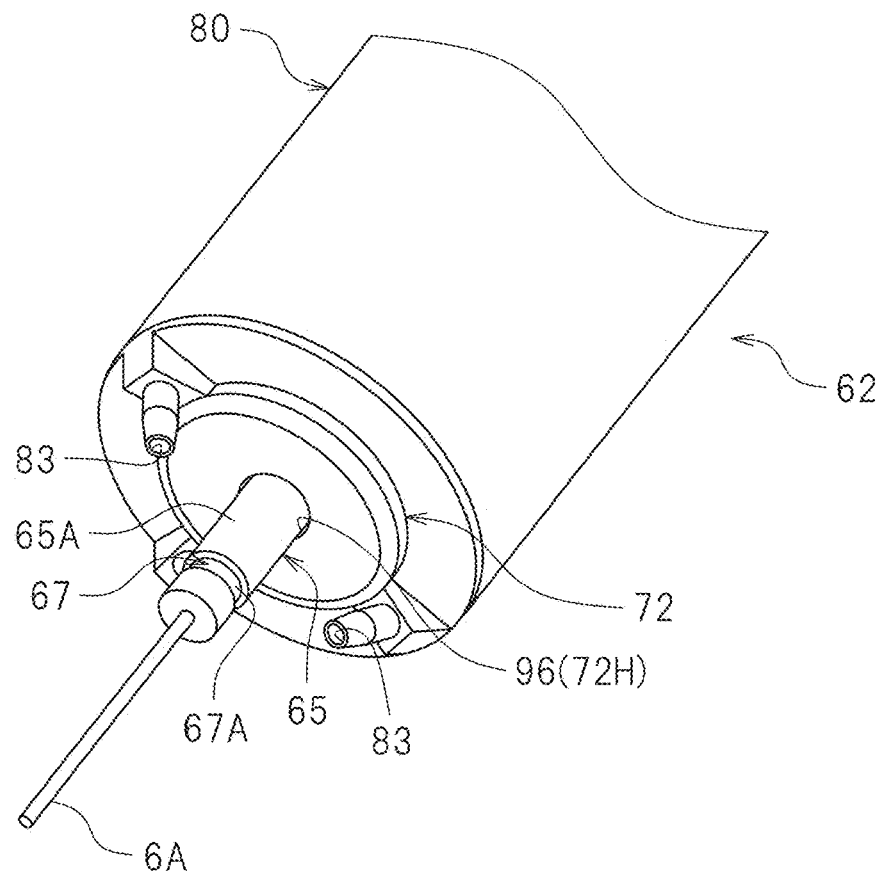
FIG. 12 is a perspective view of a spindle according to a preferred embodiment of the present invention.

As illustrated in FIG. 7, the coolant container 80 is attached to the housing 63. The coolant container 80 has a tubular shape. The coolant container 80 includes: a supply port 81 to which a coolant is to be supplied; flow passages 82 through which the coolant flows; and the nozzles 83 (see also FIG. 12) from which the coolant is to be discharged onto the machining tool 6A. The supply port 81 is connected through a liquid supply passage (not illustrated) to a storage tank 37 (see FIG. 3) provided in the case body 12. Examples of the liquid supply passage include an easily deformable tube made of resin. The coolant stored in the storage tank 37 is supplied to the supply port 81 by actuating a pump 85 (see FIG. 11) provided in the case body 12. As indicated by the arrows L1 in FIG. 7, actuating the pump 85 discharges the coolant onto the machining tool 6A from the nozzles 83. The pump 85 is controlled by the controller 48. The supply port 81 is in communication with the nozzles 83 through the flow passages 82. The nozzles 83 are defined in the coolant container 80 attached to the housing 63. The nozzles 83 are located outward of the air outlet 96. The nozzles 83 each open toward the machining tool 6A. The coolant, which has been discharged onto the machining tool 6A from the nozzles 83, returns to the storage tank 37 through the internal space 26. FIG. 8 illustrates the spindle 62, with the coolant container 80 detached from the housing 63.

As illustrated in FIG. 7, a distance LA between an axis 65P of the main shaft 65 and the air outlet 96 is shorter in a radial direction P of the main shaft 65 than a distance LB between the air outlet 96 and each nozzle 83. The lower end 83B of each nozzle 83 is located inward of an outer edge 72Q of the cover 72 in the radial direction P of the main shaft 65. In other words, the distance between the axis 65P of the main shaft 65 and the outer edge 72Q of the cover 72 is longer in the radial direction P of the main shaft 65 than the distance between the axis 65P and the lower end 83B of each nozzle 83.

As illustrated in FIG. 7, the air inlets 90 are defined in the housing 63. Air is introduced into the housing 63 through the air inlets 90. The air inlets 90 are disposed above the first bearing 64A. The air inlets 90 are disposed above the third bearing 64C. The air inlets 90 are connected through a gas supply passage (not illustrated) to the compressor 98 (see FIG. 11) provided outside the case body 12. Examples of the gas supply passage include an easily deformable tube made of resin. The compressor 98 is controlled by the controller 48. The compressor 98 supplies compressed air into the housing 63 through the air inlets 90. The air compressed by the compressor 98 may have a pressure of about 0.1 MPa or higher (e.g., about 0.2 MPa±about 0.05 MPa).

As illustrated in FIG. 8, the air passage 94 is defined in the housing 63 such that the air introduced into the housing 63 through the air inlets 90 (see FIG. 7) flows into the second through hole 72H (i.e., the air outlet 96). More specifically, the air passage 94 is defined in the housing 63 such that the air introduced into the housing 63 through the air inlets 90 flows below the first bearing 64A. The air passage 94 includes a first portion 94A, a second portion 94B, and a third portion 94C. The first portion 94A is located below the first bearing 64A. The first portion 94A is defined by the first bearing 64A and the recesses 76AH of the second securer 76. The air flowing through the first portion 94A passes along a surface of the first bearing 64A. The first portion 94A is in communication with the through holes 63CH of the first bearing holder 63C. The second portion 94B is located laterally of the first securer 74. In the present preferred embodiment, the second portion 94B is located outward of the first securer 74. The second portion 94B is located above the air outlet 96. The second portion 94B is defined by the first securer 74 and the second securer 76. Specifically, the second portion 94B is a gap created between the first securer 74 and the second securer 76. The second portion 94B is in communication with the first portion 94A. The third portion 94C is located under the first securer 74. The third portion 94C is defined by the first securer 74 and the cover 72. Specifically, the third portion 94C is a gap created between the first securer 74 and the cover 72. The third portion 94C is in communication with the second portion 94B and the air outlet 96.

The following description discusses how air flows inside the housing 63. As indicated by the arrow F1 in FIG. 7, actuating the compressor 98 (see FIG. 11) supplies compressed air into the housing 63 through the air inlets 90. The air, which has been supplied into the housing 63 through the air inlets 90, passes through the through holes 63DH of the second bearing holder 63D and flows to the spindle motor 66. The compressed air passes between the rotor 66A and the stator 66B and flows into the through holes 63CH of the first bearing holder 63C. As indicated by the arrow F2 in FIG. 8, the compressed air, which has flowed into the through holes 63CH, flows through the first portion 94A of the air passage 94 and then through the second portion 94B of the air passage 94. Because the compressed air passes below the first bearing 64A (typically under the first bearing 64A), the pressure around the first bearing 64A is positive pressure. The compressed air, which has flowed through the second portion 94B, is discharged out of the housing 63 through the third portion 94C and the air outlet 96.

As described above, the main shaft 65 is disposed through the second through hole 72H defined in the cover 72, and the main shaft 65 and the cover 72 are disposed at a distance from each other. This creates a gap (which is the air outlet 96 in the present preferred embodiment) located laterally of the main shaft 65, so that rotation of the main shaft 65 does not cause the cover 72 to rotate. Accordingly, if the cover 72 is relatively large in area, chips adhering to the cover 72 would be unaffected by a centrifugal force generated by rotation of the main shaft 65 and would thus not move. Consequently, creating the gap located laterally of the main shaft 65 reduces the amount of chips adhering to the gap.

The spindle 62 according to the present preferred embodiment preferably includes the air inlets 90 which are defined in the housing 63, which is located above the first bearing 64A, and through which air is introduced into the housing 63; the air passage 94 which is defined in the housing 63 and through which the air introduced into the housing 63 through the air inlets 90 flows into the second through hole 72H; and the air outlet 96 which is located between the main shaft 65 and a portion of the cover 72 where the second through hole 72H is provided and through which the air inside the housing 63 is discharged out of the housing 63. The air passage 94 is defined in the housing 63 such that the air introduced into the housing 63 through the air inlets 90 flows into the second through hole 72H. The air inside the housing 63 is discharged out of the housing 63 through the air outlet 96. The air passage 94 is thus maintained at positive pressure. Because air outside the housing 63 is kept from flowing into the air passage 94 through the air outlet 96, chips produced during machining of the workpiece 5 with the machining tool 6A are prevented from penetrating into the air outlet 96 accordingly.

The spindle 62 according to the present preferred embodiment includes the air outlet 96 that opens downward in the axial direction K of the main shaft 65. When the air outlet 96 opens downward in the axial direction K of the main shaft 65, chips may easily penetrate into the air outlet 96. In the present preferred embodiment, however, the air passage 94 is maintained at positive pressure. Air is thus reliably discharged from the air outlet 96 so as to prevent chips from scattering to the air outlet 96.

The spindle 62 according to the present preferred embodiment includes the coolant container 80 attached to the housing 63. The coolant container 80 is provided with the nozzles 83 which are located outward of the air outlet 96 and from which a coolant is to be discharged onto the machining tool 6A. The use of a coolant may cause chips of the workpiece 5 to mix with the coolant and scatter to the air outlet 96 together with the coolant. In the present preferred embodiment, however, the air passage 94 is maintained at positive pressure. Air is thus reliably discharged from the air outlet 96 so as to prevent the chips and the coolant from scattering to the air outlet 96. The distance LA between the axis 65P of the main shaft 65 and the air outlet 96 is shorter in the radial direction P of the main shaft 65 than the distance LB between the air outlet 96 and each nozzle 83. This reduces the amount of chips scattering to the air outlet 96.

The spindle 62 according to the present preferred embodiment includes the air outlet 96 located above the lower ends 83B of the nozzles 83. This reduces the amount of coolant scattering to the air outlet 96.

The spindle 62 according to the present preferred embodiment includes the nozzles 83 whose lower ends 83B are located inward of the outer edge 72Q of the cover 72 in the radial direction P of the main shaft 65. This reduces the amount of coolant scattering to the air outlet 96.

Some of the preferred embodiments of the present invention has been described above. The preferred embodiments described above, however, are only illustrative. The present invention may be embodied in various other forms.

In the foregoing preferred embodiments, the through holes 63CH are disposed outward of the first bearing 64A and the second bearing 64B. Alternatively, the through holes 63CH may be disposed at any other suitable locations. The through holes 63CH may be disposed inward of the first bearing 64A and the second bearing 64B. In this case, the through holes 63CH are defined, for example, in the main shaft 65. The first securer 74 may be provided with recesses similar to the recesses 76AH of the second securer 76 so as to allow air introduced into the housing 63 through the air inlets 90 to flow below the first bearing 64A.

In the foregoing preferred embodiments, the lower ends 83B of the nozzles 83 are located below the first end 65A of the main shaft 65. Alternatively, the lower ends 83B of the nozzles 83 may be located above the first end 65A of the main shaft 65. Optionally, the lower ends 83B of the nozzles 83 may be located outward of the outer edge 72Q of the cover 72.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle comprising:
    a housing including a first opening and a second opening;
    a bearing housed in the housing;
    a main shaft rotatably supported by the bearing, the main shaft being provided with a first through hole passing through the main shaft in an axial direction of the main shaft, the main shaft including:
    a first end located on a first side in the axial direction, located adjacent to the first opening, and extending out of the housing through the first opening; and
    a second end located on a second side in the axial direction and located adjacent to the second opening;
    a collet chuck disposed in the first through hole, the collet chuck being movable in the axial direction, the collet chuck including:
    a first collet end located adjacent to the first end of the main shaft, the first collet end being able to grip a machining tool to machine a workpiece; and
    a second collet end located on the second side in the axial direction;
    a draw bar disposed in the first through hole, the draw bar being movable in the axial direction, the draw bar including:
    a first bar end located adjacent to the first end of the main shaft and connected to the second collet end; and
    a second bar end located adjacent to the second end of the main shaft; and
    a cover covering the first opening, the cover being provided with a second through hole through which the main shaft extends; wherein
    the main shaft and the cover are disposed at a distance from each other;
    the housing includes:
        an air inlet which is located above the bearing and through which air is introduced into the housing;
        an air passage through which the air introduced into the housing through the air inlet flows into the second through hole; and
        an air outlet which is located between the main shaft and a portion of the cover where the second through hole is provided and through which the air inside the housing is discharged out of the housing;
    the spindle further includes a coolant container attached to the housing, the coolant container being provided with a nozzle which is located on the second side in the axial direction with respect to the air outlet and from which a coolant is to be discharged onto the machining tool;
    a distance between an axis of the main shaft and the air outlet in a radial direction of the main shaft is less than a distance between the air outlet and the nozzle; and
    a lower end of the nozzle is located inward of an outer edge of the cover in the radial direction of the main shaft.

2. The spindle according to claim 1, wherein the air outlet opens downward in the axial direction of the main shaft.

3. The spindle according to claim 1, wherein the air outlet is located above a lower end of the nozzle.

4. A cutting apparatus comprising:
    the spindle according to claim 1;
    a unit conveyor to move the spindle in a predetermined direction;
    a tool magazine that is able to house the machining tool; and
    a holder connected to the tool magazine to hold the workpiece to be machined with the machining tool.

* * * * *